March 2, 1965 W. A. MOAKLER 3,172,017
FREQUENCY-RESPONSIVE RELAY SYSTEM
Filed June 19, 1961

INVENTOR.
WILLIAM A. MOAKLER
BY
Frederick Breitenfeld
ATTORNEY

United States Patent Office 3,172,017
Patented Mar. 2, 1965

3,172,017
FREQUENCY-RESPONSIVE RELAY SYSTEM
William A. Moakler, Bergenfield, N.J., assignor to Automatic Switch Co., Florham Park, N.J., a corporation of New York
Filed June 19, 1961, Ser. No. 117,873
3 Claims. (Cl. 317—147)

This invention relates generally to alternating current control systems, and has particular reference to frequency-sensitive relays.

This application for patent is a continuation-in-part of my co-pending application, Serial No. 750,781 (now Patent No. 2,998,551).

It is a general object of the invention to provide an improved and simplified electrical relay which is responsive to changes in frequency but substantially unresponsive to changes in voltage.

Frequency-responsive relays that are designed for useful operation within a particular frequency range will often operate in undesirable ways beyond this range. For example, they may reclose or reopen, as the case may be, to bring about unintentional operation or deactivation of electrical equipment. To prevent such undesired results it is often necessary, at added cost, to provide special additional circuitry and relays merely for this corrective purpose.

Another shortcoming of some frequency-responsive relays manifests itself in the case of a relay which is dependent upon a resonant peak current for pickup. Sometimes the frequency goes rapidly past and beyond the preselected frequency point before the relay can respond.

It is an objective of this invention to provide a frequency-responsive relay which obviates these and other disadvantages, and which is simple in structural nature, small in size, inexpensive to manufacture, and dependable in operation.

It is a characterizing feature of the improved relay that it is reliably inoperative at all frequencies below a preselected value and becomes and remains reliably activated at all frequencies above this value. This result is achieved by providing the relay with a non-polarized armature and with a magnetic core having a single magnetic flux path and two oppositely arranged windings on the core; the windings are arranged to produce magneto-motive forces in opposition to each other; and circuitry is provided to maintain the current differential in the windings below relay-actuating magnitude at all frequencies below the selected value and to raise it to, and maintain it at or above, relay-actuating magnitude at all frequencies above the predetermined value. The armature of the relay is provided with a spring or equivalent means for yieldably urging it to a drop-out position, and regardless of which core winding predominates the armature is magnetically attracted out of this position whenever the frequency exceeds the selected value, and is allowed to resume its drop-out position whenever the frequency falls below this value.

The core windings receive the output of two rectifiers, respectively, each in a separate circuit connected to the source of alternating current power whose frequency may vary. The circuits are frequency-responsive, but in different ways. They are so constructed (by employment of specially chosen characterizing components) that they produce different patterns of frequency-responsive current variations. In the preferred embodiments of the invention, these patterns are such that at all frequencies above the selected value the current flowing in one of the circuits is adequately different in magnitude from the current flowing in the other so that the relay armature will be moved, whereas at all frequencies below this value the current differential is insufficient to do so.

Several ways of achieving the objects and advantages of the invention are illustrated in the accompanying drawings, in which—

Figure 1:
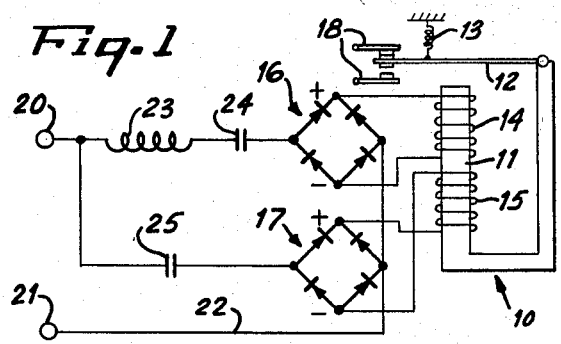
FIG. 1 is a schematic diagram of connections showing one embodiment of the invention.

The relay 10 shown in FIG. 1 comprises a main core 11 having a single magnetic flux path, and a non-polarized armature 12 yieldably biased into the drop-out position shown by a yieldable means such as the spring 13. Mounted on the core 11 are two oppositely-acting windings 14 and 15, these windings being arranged to produce magnetomotive forces in opposition to each other. One winding is connected to receive the output of a first rectifier 16, and the other is connected to receive the output of a second rectifier 17. The rectifiers chosen for illustration comprise four rectifier elements each, to form what is commonly known as a rectifier bridge, but other rectifier circuits may be employed if desired.

The alternating current power whose frequency may vary is applied to two input terminals 20 and 21. The terminal 21 is connected to conductor 22 which leads to both bridge circuits 16 and 17, thereby forming a common conductor which may be grounded if desired. Terminal 20 is connected to a first frequency-responsive circuit, whose characterizing components are a reactor 23 and a capacitor 24 connected in series. This circuit is connected in series between the input terminals and the first rectifier 16. Terminal 20 is also connected to a second frequency-responsive circuit leading in series to the second rectifier 17. The characterizing component of this circuit is a capacitor 25.

Figure 2:
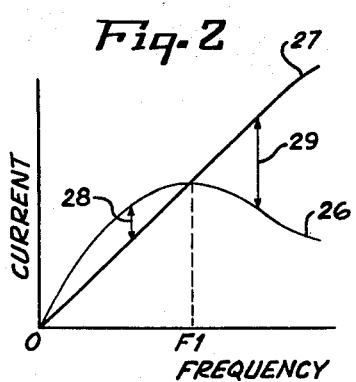
FIG. 2 is a graph showing the current-variation patterns that control the operation of the relay of FIG. 1.

In FIG. 2, the curve 26 represents the current-variation pattern in the first circuit, which feeds relay winding 14, as the frequency of the input varies. This pattern is an upwardly convex curve, indicating that as the frequency rises the current rises at a gradually decreasing rate, reaching a peak, then falling off again. The sharpness of the peak can be altered, as may be desired, by a choice of values of the inductance and capacitance employed, and by varying the resistance in the circuit. The curve 27 represents the response pattern of the second circuit, which feeds relay winding 15. The curve 27 indicates a continuing substantially straight-line rise in current as the frequency rises, due to the characterizing component 25. The larger the capacitor is, the steeper the rise in current will be.

In practice, the selection of circuit components and characteristics to be employed is determined by the frequency $F_1$ below which the relay is to remain inactive, and above which the armature is to be magnetically moved. The response patterns are so designed that at frequencies below $F_1$ the difference between the curves (e.g., the vertical distance 28) is insufficient to cause actuation of the relay, whereas at frequencies above $F_1$ the patterns diverge so that the current differential rapidly rises to, and thereafter remains at or greater than, a current differential 29 which is adequate to cause the relay magnetically to draw the armature out of its drop-out position.

In the circuitry shown, the curves 26, 27 intersect at frequency $F_1$, hence at this frequency the currents flowing in core windings 14 and 15 are equal and opposite and nullify each other.

Figure 3:
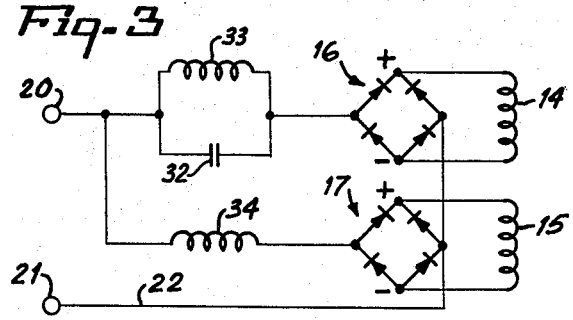
FIG. 3 is a schematic diagram similar to FIG. 1, showing a modification.
Figure 4:
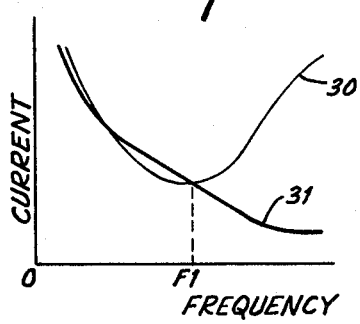
FIG. 4 is a graph similar to FIG. 2, showing the current-variation characteristics of FIG. 3.

In FIG. 3 the same principle of operation is employed, except that (see FIG. 4) the current-variation patterns are reversed. Thus, the current in the first circuit falls and then rises again (curve 30) as the frequency rises, and the current in the second circuit follows a continuing downward slope (curve 31). These responses are due to the fact that the characterising components in the first circuit are the capacitor 32 and reactor 33 connected in parallel (rather than in series as in FIG. 1), and the characterising component in the second circuit is the reactor 34. The size of this reactor determines the steepness of the curve 31 of FIG. 4.

As before, the selection of components is dependent upon the frequency value $F_1$ chosen to control the operating characteristics of the relay. The curves 30, 31 may or may not intersect, as shown, but at all frequencies below $F_1$ the current differential is always smaller in magnitude than is required to actuate the relay, whereas at frequencies above $F_1$ the curves diverge as in FIG. 2.

Figure 5:
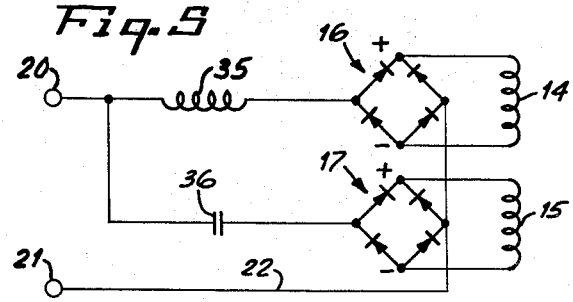
FIG. 5 is a schematic diagram of another embodiment.
Figure 6:
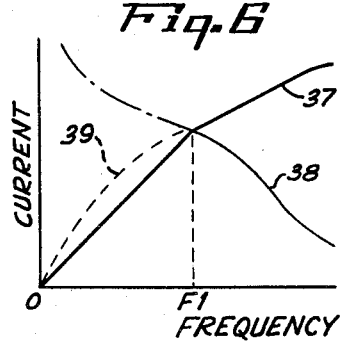
FIG. 6 is a graph depicting the current variations that control the functioning of the relay of FIG. 5.

In FIG. 5 a modified arrangement is shown in which the characterising component in the first circuit is a reactor 35, and the characterising component in the second circuit is a capacitor 36. The continuously rising current response of the capacitor circuit (curve 37, FIG. 6) and the continuously falling current response of the reactor circuit (curve 38, FIG. 6) can be resorted to to achieve the desired divergence of the patterns at frequencies above the selected value $F_1$. However, other means must be available at frequencies below the selected drop-out value for causing a current drop in the reactor circuit. This condition exists in the case of an engine generator where the current response (as well as frequency) is more or less directly proportional to voltage change as the generator comes up to speed from a rest condition, or vice versa. This current response is indicated by the dotted line 39 in FIG. 6.

It will thus be seen that the invention makes it possible to provide an extremely simple and inexpensive relay which responds to frequency variations in a reliable predetermined manner, whereby at all frequencies above a selected value, and regardless of voltage fluctuations, the armature of the relay will be drawn in and held, and whereby the armature will be magnetically released and allowed to resume its drop-out position if the frequency falls again to the selected drop-out value or below. The armature movement is independent of whether one core winding or the other predominates.

Obviously, the armature movement may be employed for any desired purpose. In FIG. 1 a pair of opposed contacts 18 has been illustratively shown, the armature carrying an intermediate contact that engages with one or the other, depending upon the position of the armature.

It will be understood that fixed or variable resistors may be employed in the various circuits, when needed or desired for purposes of adjustment, without altering the basic mode of operation, and that other changes in details may be made by those skilled in the art without necessarily departing from the spirit and scope of the invention as expressed in the appended claims.

What is claimed is:

1. A frequency-responsive relay system comprising: a pair of input terminals for connection to a source of alternating current power which may vary in frequency, a first circuit connected in series between the input terminals and a first rectifier, a second circuit connected in series between the input terminals and a second rectifier, a relay having a non-polarized armature and a core having a single magnetic flux path, means yieldably urging the armature to a drop-out position, and two windings on said core arranged to produce magnetomotive forces in opposition to each other, one of said windings being connected to receive the output of one of said rectifiers and the other winding being connected to receive the output of the other rectifier, said first and second circuits being so constructed that they produce different patterns of frequency-responsive current variation, the patterns being such that at all frequencies above a predetermined value the current flowing in one of said circuits is sufficiently different in magnitude from the current flowing in the other that the armature is magnetically attracted out of its drop-out position, and at all frequencies below said value the current differential is insufficient to do so.

2. A frequency-responsive relay system as defined in claim 1, wherein the characterizing component of one of said circuits is a capacitor, and that of the other circuit is a capacitor and a reactor in series.

3. A frequency-responsive relay system as defined in claim 1, wherein the characterizing component of one of said circuits is a reactor, and that of the other circuit is a capacitor and a reactor in parallel.

References Cited by the Examiner

UNITED STATES PATENTS

| 1,959,161 | 5/34 | Grondahl | 307—129 X |
| 2,721,297 | 10/55 | Estelle | 317—155.5 |
| 2,960,631 | 11/60 | Taylor | 317—155.5 X |
| 2,998,551 | 8/61 | Moakler | 317—147 |

FOREIGN PATENTS

| 662,881 | 7/38 | Germany. |
| 233,004 | 9/44 | Switzerland. |
| 623,970 | 5/49 | Great Britain. |

SAMUEL BERNSTEIN, *Primary Examiner.*